United States Patent [19]
Siener, Jr. et al.

[11] Patent Number: 5,271,992
[45] Date of Patent: Dec. 21, 1993

[54] LAMINAR SHEET CONSTRUCTION

[75] Inventors: Philip R. Siener, Jr., Greene; Peter H. Scott, Barrington, both of R.I.

[73] Assignee: Cooley, Incorporated, Pawtucket, R.I.

[21] Appl. No.: 659,880

[22] Filed: Feb. 22, 1991

[51] Int. Cl.⁵ .................. B32B 5/14; B32B 27/02; B32B 5/16
[52] U.S. Cl. .................. 428/204; 428/171; 428/253; 428/207; 428/286
[58] Field of Search .............. 428/171, 253, 286, 204, 428/207

[56] References Cited

U.S. PATENT DOCUMENTS

| | | | |
|---|---|---|---|
| 4,113,907 | 9/1978 | Haage et al. | 428/193 |
| 4,341,443 | 7/1982 | Robinson | 428/79 |
| 4,468,422 | 8/1984 | Siener, Jr. et al. | 428/192 |

Primary Examiner—George F. Lesmes
Assistant Examiner—Kathryne Elaine Shelborne

[57] ABSTRACT

Graphic laminar sheet material in which a barrier layer separates a base layer and an eradicable layer of color contrasting with the base layer.

7 Claims, 1 Drawing Sheet

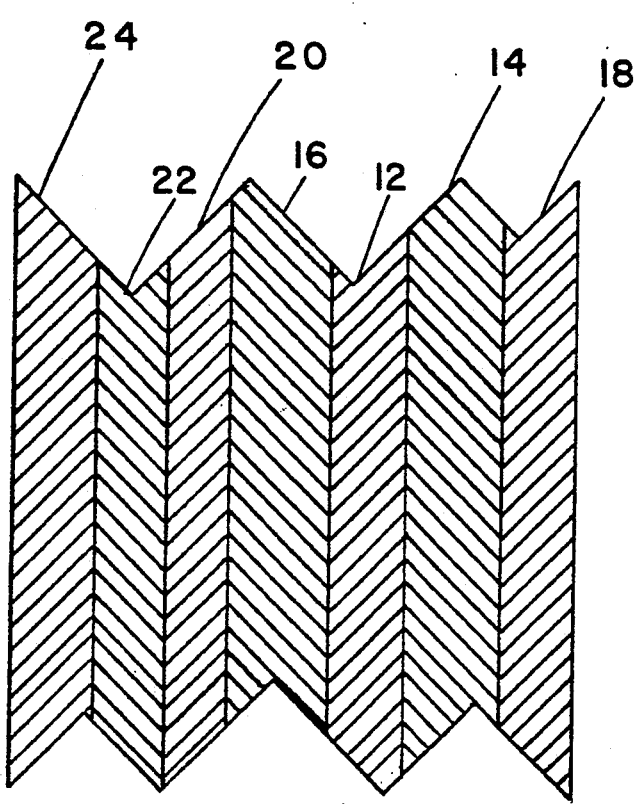
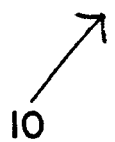

LAMINAR SHEET CONSTRUCTION

FIELD OF THE INVENTION

The field of the invention is illuminated signs and awnings.

BACKGROUND OF THE INVENTION

Illuminated signs are known in which contrast is provided by selectively eradicating certain areas of one layer to expose corresponding areas of a layer of contrasting color, and in which the resultant signs are protected by a superposed layer of transparent material.

SUMMARY OF THE INVENTION

We have discovered that an improved laminar sheet construction particularly adapted to use in making illuminated signs may be provided by providing between a base layer and an eradicable layer of contrasting color an ineradicable barrier layer.

In preferred embodiments, a base layer includes reinforcement with a layer of weft insertion process fabric between two adherent layers of translucent vinyl, barrier layers adherently overlie both surfaces of the base layer, a pigmented eradicable material layer overlies one of said barrier layers, and a third (eradicable) barrier layer overlies the pigmented layer.

PREFERRED EMBODIMENT

The presently preferred embodiment of the invention is described: drawing, structure, manufacture, and use.

DRAWING

In the drawing is shown the preferred embodiment, diagrammatically, partially broken away, and not to scale.

STRUCTURE

There is shown in the figure a sign 10 with a central portion 12, 14, 16 shown diagrammatically as three layers, although fabric portion 12 is in fact embedded in plastic layers 14, 16.

Fabric element 12 is of weft insertion process (a process generally disclosed in Siener, Jr. et al. U.S. Pat. No. 4,468,422, "Material Useful as Roofing", granted Aug. 28, 1984). A fabric made by a weft insertion process has warp and weft threads that bear simple overlying relationships (not interwoven) and a third set of strands tying together warp and woof. Element 12 has extending in a warp direction (the long or longitudinal dimension of the layer, which is initially 84 inches in its other, width, or transverse, or weft, direction) 3-ply (twisted about one another with one and a half turns per inch) warp twists, each ply being of 200 denier continuous filament high tenacity polyester heat set at 350° F., there being 18 such 3-ply warp twists per inch of layer 12 in a transverse direction.

Extending in a transverse direction in layer 12 are weft continuous filaments of high tenacity polyester, 500 denier, heat set at 350° F., 20 filaments per longitudinal inch.

By "high tenacity" is meant that breaking occurs under tension at about six grams per denier (i.e., at about 3000 grams for a 500 denier filament).

The warp twists and woof filaments above described are not interwoven, but rather extend each in general in loci in which the axis of each warp twist is in one plane and the axes of the weft filaments are in another plane, the planes being spaced as closely as practical to each other. The warp twists and filling (woof) filaments are held together by knitting yarn, 70 denier continuous filament polyester heat set at 350° F., in a tricot stitch.

The fabric 12 is made resistant to wicking by treatment of the fabric or yarn from which it is made with a chemical suitable for the purpose, (e.g., an anti-wicking agent available from DuPont under the Zepel trade designation) a fabric as sold by Milliken under style number 75986.

Layers 14, 16 are of thermoplastic material, a mixture of (by weight) 60 percent Geon EA29 (trademark and designation of the B. F. Goodrich Company, Akron, Ohio) and 40 percent Geon EA14 (trademark and designation of the same company), providing a translucent polyvinyl chloride formulation.

Layers 14, 16 are each of thickness of 0.008 inches, and the overall thickness of portion 12, 14, 16 is 0.016 the fabric portion 12 not contributing significantly to thickness.

Barrier layers 18, 20 are adhered to layers 14, 16 and are constituted of a plastic composition consisting of (by weight) 98.5 parts acrylic resin sold by Rohm & Haas under the name PRD-32; 0.5 parts 2(2'-hydroxy-5'-methylphenyl) benzotriazole sold by Ciba-Geigy under the name Tinuvin P (an ultraviolet stabilizer); and 1.0 part octadecyl 3,5-di-tert-butyl-4-hydroxy hydrocinnamate (an antioxidant).

Layers 18, 20 are each 0.002 inches in thickness.

Pigmented layer 22 is then deposited over barrier layer 20 by the rotary screen printing process, in which a stationary squeegee forces liquid through the metering holes of a rotating screen defining with a counter pressure roll a nip.

Pigmented translucent layer 22 is adhered to barrier layer 20 and is formulated as follows (parts by weight):

| | |
|---|---|
| Elvacite 2014 | 24.7% |
| Neocryl B734 | 13.3% |
| Propylene Glycol Monomethylether Acetate | 33.0% |
| Ethylene Glycol Monobutylether Acetate | 18.0% |
| Defoamer AF9000 | 0.5% |
| Cyasorb UV5411 | 0.5% |
| Phthalocyan Pigment | 10.0% |
| | 100.0% |

Elvacite 2014 is a methyl methacrylate polymer sold under that designation by DuPont. Neocryl B734 is an acrylic polymer sold under that designation by ICI. Defoamer AF 9000 is a dimethyl silicone antifoam sold under that designation by General Electric. Cyasorb UV 5411 is a 2-(2-Hydroxy-5-Tert-Octyl Phenyl) Benzotriazole product sold under that designation by American Cyanamid. The phthalocyan pigment is a chlorinated copper phthalocyanine, pigment blue 1513, color index number 74160, sold under that designation by Mobay.

Pigmented layer 22 is two microns in thickness.

Adherent to pigmented layer 22 is transparent barrier layer 24, which has the following formulation (parts by weight):

| | |
|---|---|
| Polymethylacrylate | 25.0 |
| Toluene | 62.5 |

| | |
|---|---|
| Multiflow | 2.0 |
| Dibasic Ester | 10.0 |
| Cyasorb UV5411 | 0.5 |
| | 100.0 |

Barrier Layer 24 is 10 microns in thickness. Multiflow is a copolymer of ethyl acrylate and 2-ethyl-hexyl acrylate, in xylene solution, sold under the specified designation by Monsanto. Dibasic ester is a blend of dimethyl esters of succinic, glutaric, and adipic acid, sold under that designation by DuPont.

Manufacture

The preferred embodiment above described is made as follows.

There is extruded through a die slot at 360° F. onto preheated fabric 12, and pressed thereinto by a steel roller biased thereagainst at 240 pounds per linear inch, white, translucent, thermoplastic layer 14, layer 12 being supported to facilitate merger of fabric and thermoplastic thereinto by a rubber roller, all as well understood in the extrusion coating art.

Coextruded with layer 14 is barrier layer 18, which is extruded from a second extruder through the same die as is extruded layer 14. These layers are extruded into and through a common manifold, but do not mix, as is understood in the art. Barrier layer 18 is 0.002 inches in thickness.

The composite 12, 14, 18 is then turned over and passed again through the extruder and rollers, in the same way, to apply base layer 16, just as was, and like, layer 14; and barrier layer 20, just as was, and like, layer 18.

Layers 22 and 24 are added as above described, using a rotary screen printer.

There is thus provided the flexible preferred embodiment above described, with translucent base layers 14, 16; transparent barrier layers 18 and 20; selectively eradicable pigmented layer 22, and transparent selectively eradicable layer 24.

Use

This material is particularly useful in fabricating illuminated signs. Selected areas of layers 22 and 24 may be removed, as by a stencil-like operation, whereupon a contrasting pattern defining words or otherwise appears between the eradicated and uneradicated portions of layer 22.

The presently preferred material for use in eradicating layers 22 and 24 is a mixture of 35% acetone and 65% methylene chloride.

The barrier layers protect against weathering and dirt and other environmental sources of contamination, as well as in certain instances against undesired outward migration of formulation components, such as plasticizers, to lengthen adhesive life of both pigmented and pressure-sensitive layers.

Enormous signs can be made using the invention: for example, with heat welding, thirty feet by fifty feet.

For illuminating the sign 10, lighting (not shown) may be placed behind barrier layer 18.

Other Embodiments

Other embodiments within the invention will occur to those skilled in the art.

For example, anti-wicking material may be applied to the yarns involved before the fabric is made from them. Woven or knitted fabrics not of the weft insertion type may be used. Other formulations may be used for the various layers, and for the eradicating material. Embodiments may be neither flexible nor translucent. Layers 20 and 22 may be of two contrasting colors one of which is white, or neither of which is white. Pressure-sensitive tape may be applied in eradicated or other areas for further color options.

What is claimed is:

1. Graphic sheet material comprising:
   a base layer,
   a first barrier layer overlying one side of said base layer,
   a second barrier layer overlying an opposite side of said base layer,
   a fourth layer over said first barrier layer,
   said fourth layer being of color different from said base layer, and
   said fourth layer being differentially soluble with respect to said base layer and said first barrier layer,
   and a fifth layer over said fourth layer,
   said fifth layer being soluble with said fourth layer, differentially from said first barrier layer.

2. The sheet material of claim 1 in which said base layer is reinforced with fabric.

3. The sheet material of claim 2 in which said fabric is of weft insertion process type.

4. The material of claim 2 in which warp, weft, and knitting threads of said fabric are monofilament.

5. The material of claim 4 in which said threads are high tenacity.

6. The sheet material of claim 1 in which said base layer is of vinyl plastic.

7. The material of claim 6 in which said base layer is translucent.

* * * * *